United States Patent
Xie et al.

(10) Patent No.: US 10,649,596 B2
(45) Date of Patent: May 12, 2020

(54) TOUCH PANEL AND TOUCH METHOD THEREOF, ELECTRONIC DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Zhenmei Xie, Beijing (CN); Huizhe Lin, Beijing (CN); Qian Qian, Beijing (CN); Zhiyong Li, Beijing (CN); Jia Liu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/941,837

(22) Filed: Mar. 30, 2018

(65) Prior Publication Data
US 2019/0095001 A1   Mar. 28, 2019

(30) Foreign Application Priority Data
Sep. 25, 2017   (CN) .......................... 2017 1 0874888

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 3/0418* (2013.01); *G06F 2203/04101* (2013.01)

(58) Field of Classification Search
CPC ...................................................... G06F 3/041
See application file for complete search history.

(56) References Cited

U.S. PATENT DOCUMENTS

| 9,310,948 B2 | 4/2016 | Sun et al. | |
| 10,345,946 B2 | 7/2019 | Chen et al. | |
| 2017/0160844 A1* | 6/2017 | Li | G06F 3/044 |
| 2017/0185224 A1* | 6/2017 | Nagata | G06F 3/044 |
| 2017/0228074 A1 | 8/2017 | Du et al. | |
| 2017/0242531 A1* | 8/2017 | Soya | G02F 1/13338 |
| 2017/0285847 A1* | 10/2017 | Uehara | G06F 3/044 |

FOREIGN PATENT DOCUMENTS

| CN | 103294317 A | 9/2013 |
| CN | 104881167 A | 9/2015 |
| CN | 105549792 A | 5/2016 |
| CN | 106095186 A | 11/2016 |
| CN | 107015702 A | 8/2017 |

OTHER PUBLICATIONS

The First Chinese Office Action dated Nov. 8, 2019; Appln. No. 201710874888.5.

* cited by examiner

*Primary Examiner* — Roy P Rabindranath

(57) ABSTRACT

A touch panel and a touch method thereof, and an electronic device are provided. The touch panel includes a first touch detection line, a touch electrode, a second touch detection line and a first switch element. The first touch detection line is connected with the touch electrode and is insulated from the second detection line, and the second detection line is connected with the touch electrode through the first switch element.

12 Claims, 3 Drawing Sheets

TOUCH PANEL AND TOUCH METHOD THEREOF, ELECTRONIC DEVICE

TECHNICAL FIELD

Embodiments of the present invention relate to a touch panel and a touch method thereof, and an electronic device.

BACKGROUND

Touch technology has an increasingly wide application in electronic products such as cellphones, tablets, laptops and the like, along with the continuous development of the touch technology. Usually, a touch panel can be categorized into types such as a capacitive type, a resistive type, an electromagnetic type, an optical type or the like. A capacitive touch panel can be categorized as an add-on mode touch panel, an on-cell mode touch panel and an in-cell touch panel. The in-cell touch panel can integrate touch driving electrodes and touch sensing electrodes in a display screen, and achieve a touch sensing function and a display function at the same time, so that the total thickness of the display device can be effectively reduced and the manufacturing process can be simplified. The in-cell touch panel is becoming the mainstream of the display field due to its characteristics such as simple structure, light and thin profile, low cost and the like.

SUMMARY

At least one embodiment of the present disclosure provides a touch panel, comprising a first touch detection line, a touch electrode, a second touch detection line and a first switch element. The first touch detection line is connected with the touch electrode and is insulated from the second detection line, and the second detection line is connected with the touch electrode through the first switch element.

For example, a touch panel provided by an embodiment of the present disclosure further comprises a first gate line. The first gate line is connected with the touch electrode through the first switch element.

For example, in a touch panel provided by an embodiment of the present disclosure, the first switch element comprises a switch transistor. A first electrode of the switch transistor is connected with the second touch detection line, a second electrode of the switch transistor is connected with the touch electrode, and a gate electrode of the switch transistor is connected with the first gate line.

For example, in a touch panel provided by an embodiment of the present disclosure, the first gate line is configured to provide a first gate signal to the gate electrode of the switch transistor to control the switch transistor.

For example, a touch panel provided by an embodiment of the present disclosure further comprises a display pixel. The display pixel comprises a second switch element, and the first gate line is further configured to provide a second gate signal to the second switch element to control the second switch element. The first gate signal is different from the second gate signal.

For example, a touch panel provided by an embodiment of the present disclosure further comprises a display pixel and a second gate line. The display pixel comprises a second switch element, and the second gate line is configured to provide a second gate signal to the second switch element to control the second switch element. The first gate signal is different from the second gate signal.

For example, a touch panel provided by an embodiment of the present disclosure comprises a plurality of touch electrodes, a plurality of first touch detection lines, a plurality of second touch detection lines and a plurality of first switch elements. The plurality of touch electrodes are arranged in plural rows and plural columns, and the plurality of first touch detection lines are respectively connected with the plurality of touch electrodes in one-to-one correspondence; the plurality of second touch detection lines extend along a column direction of the plurality of touch electrodes, and are respectively connected with the columns of the plurality of touch electrodes in one-to-one correspondence through the plurality of first switch elements.

For example, a touch panel provided by an embodiment of the present disclosure further comprises a plurality of first gate lines. The plurality of first gate lines extend along a row direction of the plurality of touch electrodes, and are respectively connected with the rows of the plurality of touch electrodes in one-to-one correspondence through the plurality of first switch elements.

For example, a touch panel provided by an embodiment of the present disclosure further comprises a touch driving circuit. The touch driving circuit is configured to provide a touch driving signal to the first touch detection line and the second touch detection line.

For example, a touch panel provided by an embodiment of the present disclosure further comprises a touch detection circuit. The touch detection circuit is configured to detect a touch sensing signal output from the first touch detection line to determine whether an abnormal touch electrode is present.

For example, a touch panel provided by an embodiment of the present disclosure further comprises a touch control circuit. The touch control circuit is configured to control the second touch detection line to transmit the touch driving signal to the abnormal touch electrode.

For example, in a touch panel provided by an embodiment of the present disclosure, an extension direction of the first touch detection line is same as an extension direction of the second touch detection line.

At least one embodiment of the present disclosure further provides an electronic device comprising any one of the above mentioned touch panels.

At least one embodiment of the present disclosure further provides a touch method of the touch panel, comprising: controlling the first touch detection line to transmit a touch driving signal to the touch electrode; detecting a touch sensing signal output from the first touch detection line to determine whether the touch electrode is an abnormal touch electrode; and in a case where the touch electrode is an abnormal touch electrode, controlling the second touch detection line to transmit the touch driving signal to the touch electrode.

For example, in a touch method provided by an embodiment of the present disclosure, the touch panel further comprises a first gate line, and the first switch element comprises a switch transistor; a first electrode of the switch transistor is connected with the second touch detection line, a second electrode of the switch transistor is connected with the touch electrode, and a gate electrode of the switch transistor is connected with the first gate line. Controlling the second touch detection line to transmit the touch driving signal to the abnormal touch electrode comprises: transmitting a first gate signal through the first gate line to the switch transistor connected with the abnormal touch electrode, so as to turn on the switch transistor connected with the abnormal touch electrode; and transmitting the touch driving signal to the abnormal touch electrode through the second touch detection line.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
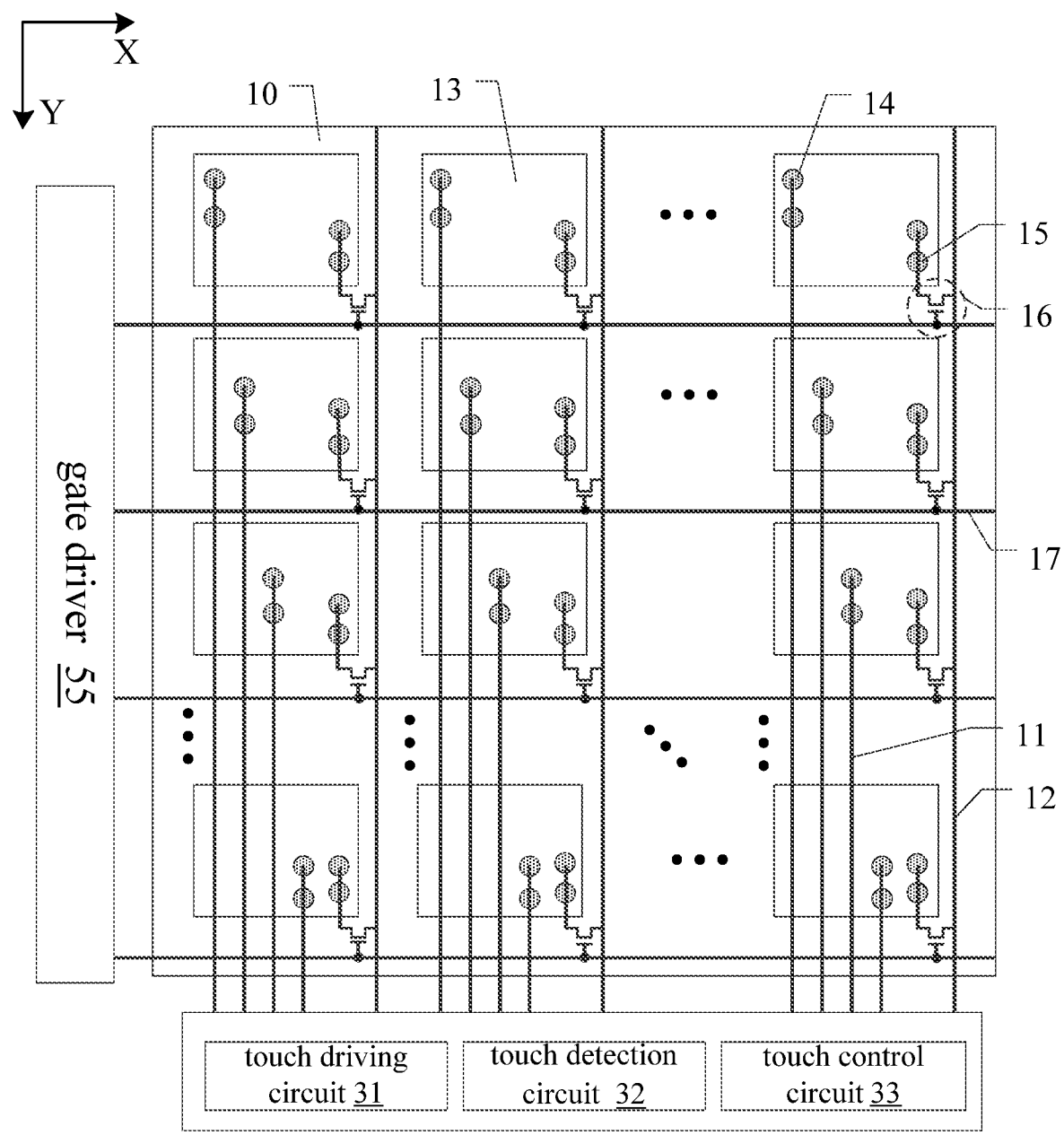
FIG. 1 is a plane structure schematic view of a touch panel provided by an embodiment of the present disclosure.

In order to make objects, technical details and advantages of the embodiments of the invention apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure for invention, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In order to make the below descriptions about the embodiments of the present disclosure clear and concise, the present disclosure omits detailed descriptions of the well-known function(s) and component(s).

At present, in the touch design of a display product, a touch driver and a display driver can be integrated in one chip using a touch and display driver integration (TDDI) technology so as to uniformly control the touch operation and the display operation through one chip. TDDI products are becoming the mainstream of the market due to advantages such as low cost, light weight and thin profile, high sensitivity, quick response speed, simple process and the like.

TDDI products comprise structures such as a hybrid in-cell (HIC) structure and a full in-cell (FIC) structure. The HIC structure adopts a single-layer routing design and achieves multiple-touch through the self-capacitance principle. In the FIC structure, each touch electrode is connected with a touch sensing (touch panel mate, TPM) line, and the touch driving signal and the touch sensing signal both are transmitted through one TPM line. Thus, in a case that an abnormality (for example, the TPM line is scratched, the TPM line is shorted, and the TPM line is abnormal due to a hole, etc.) occurs on a TPM line, the touch sensing signal of the touch electrode electrically connected with the TPM line cannot be detected, which affects the touch property of the touch product and causes unnecessary waste.

Embodiments of the present disclosure provide a touch panel and a touch method thereof, and an electronic device. A second touch detection line is added so that a corresponding second touch detection line can be enabled to transmit touch signals to the touch electrode in a case that the signals output by the first touch detection line is abnormal. In this way, the touch sensing stability is increased, the product performance is improved, and the product yield is promoted.

It should be noted that, transistors can be categorized into N-type transistors and P-type transistors according to the characteristics of the transistors. A source electrode and a drain electrode of a transistor may be symmetrical in structure, so that the source electrode and the drain electrode of the transistor may have no difference in physical structure. In the embodiments of the present disclosure, for distinction, one of the electrodes other than the gate electrode is described as a first electrode and the other is described as a second electrode. Thus, the first electrode and the second electrode of part or all of the transistors in embodiments of the present disclosure can be interchangeable as needed. For example, for the N-type transistor, the first electrode of the transistor can be the source electrode and the second electrode can be the drain electrode; or for the P-type electrode, the first electrode of the transistor can be the drain electrode, and the second electrode can be the source electrode.

A detailed description will be given below in conjunction with the drawings, in order to illustrate the display panel and the touch method thereof, and the electronic device provided by embodiments of the present disclosure. However, the present disclosure is not limited to the specific embodiments.

Figure 2A:
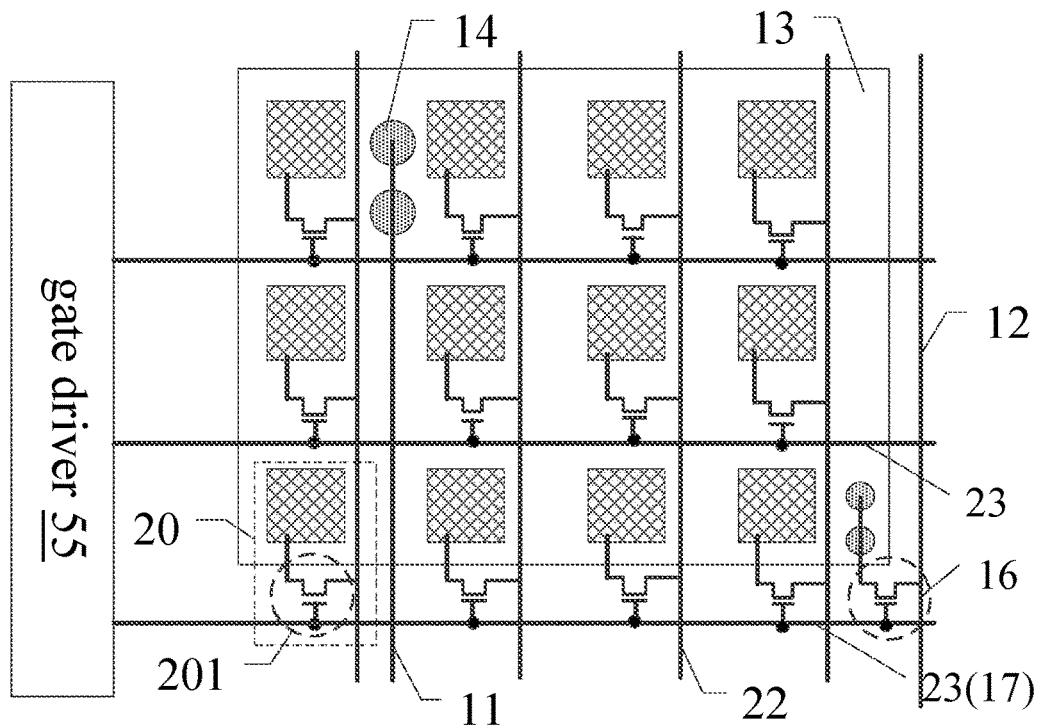
FIG. 2A is a partial structure schematic view of a touch panel provided by an embodiment of the present disclosure.
Figure 2B:
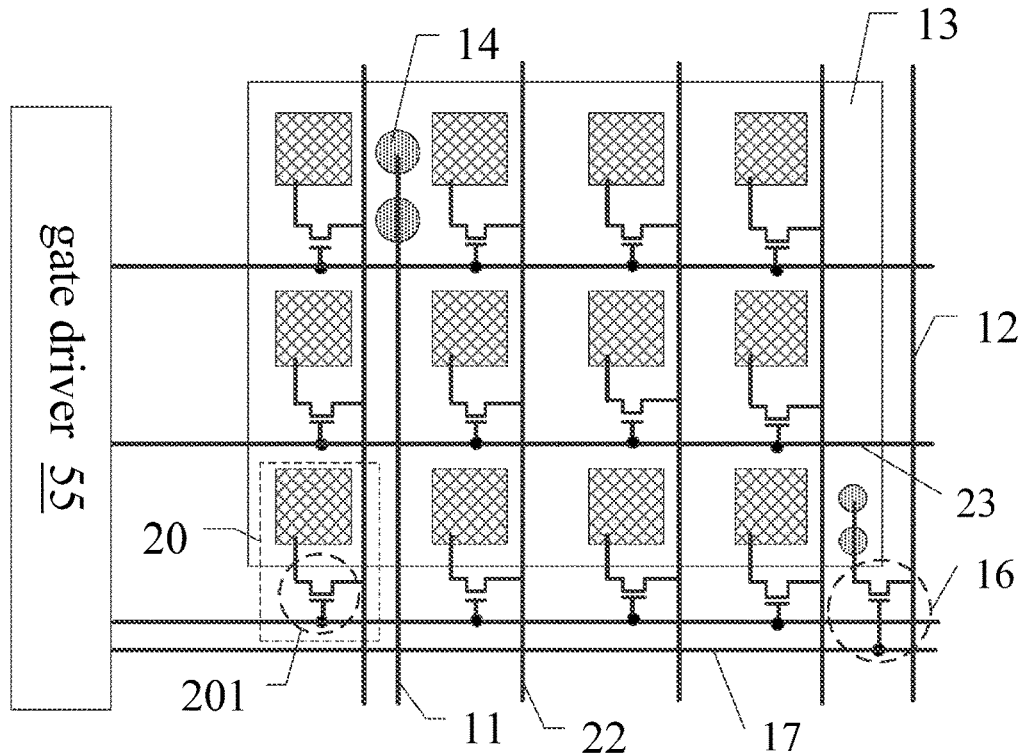
FIG. 2B is another partial structure schematic view of a touch panel provided by an embodiment of the present disclosure.

FIG. 1 is a plane structure schematic view of a touch panel provided by an embodiment of the present disclosure, FIG. 2A is a partial structure schematic view of a touch panel provided by an embodiment of the present disclosure, and FIG. 2B is another partial structure schematic view of a touch panel provided by an embodiment of the present disclosure.

For example, as illustrated in FIG. 1, the touch panel 10 provided by an embodiment of the present disclosure comprises a substrate 10, a first touch detection line 11, a second touch detection line 12 and a touch electrode 13. The first touch detection line 11, the second touch detection line 12 and the touch electrode 13 are disposed on the substrate 10. The first touch detection line 11 is connected with the touch electrode 13 and is insulated from the second touch detection line 12; as shown the first touch detection line 11 is directly connected with the touch electrode 13 without an intermediate switch element. The second touch detection line 12 is connected with the touch electrode 13 through a first switch element 16.

In the touch panel provided by the embodiments of the present disclosure, a second touch detection line is added, so that a corresponding second touch detection line can be enabled to transmit touch signals to the touch electrode in a case that the signals output by the first touch detection line is abnormal. In this way, the touch control is increased and the product performance is improved.

For example, as illustrated in FIG. 1, the touch panel 10 comprises a plurality of touch electrodes 13, a plurality of first touch detection lines 11 and a plurality of second touch detection lines 12. The plurality of touch electrodes 13 are arranged in plural rows and plural columns, and the touch electrodes 13 constitute a self-capacitance electrode array configured for touch detection. The plurality of first touch detection lines 11 are connected with the plurality of touch electrodes 13 in one-to-one correspondence, so that each touch electrode 13 can be detected singly and the multi-touch function is achieved. The plurality of second touch detection lines 12 extend along a column direction of the plurality of touch electrodes 13 and are connected with the columns of the plurality of touch electrodes 13 in one-to-one correspondence through a plurality of first switch elements 16. That is, each touch electrode 13 is connected with one second touch detection line 12 through one first switch element 16, and touch electrodes 13 arranged in the same column can be connected with the same second detection line 12. For example, the column direction of the plurality of touch electrodes 13 is a Y direction as illustrated in the drawings.

For example, the plurality of first touch detection lines 11 and the plurality of second touch detection lines 12 are insulated from each other.

For example, an extension direction of the plurality of first touch detection lines 11 can be the same as an extension direction of the plurality of second touch detection lines 12. Cases are not limited to this example. The extension direction of the plurality of first touch detection lines 11 can be different from the extension direction of the plurality of second touch detection lines 12, and in this case, the first touch detection lines 11 and the second touch detection lines 12 are formed in different layers so as to be insulated from each other.

For example, the plurality of first touch detection lines 11 are arranged in parallel, the plurality of second touch detection lines 12 are also arranged in parallel, and the plurality of first touch detection lines 11 and the plurality of second touch detection lines 12 are parallel to each other.

For example, the plurality of first touch detection lines 11 and the plurality of second touch detection lines 12 can be disposed in a same layer. For example, during the formation, the plurality of first touch detection lines 11 and the plurality of second touch detection lines 12 can be formed through a same patterning process using one metal film. In this way, the manufacturing process of the touch panel is simplified, the manufacturing cost is reduced and the routing is facilitated. However the present disclosure is not limited thereto, the plurality of first touch detection lines 11 and the plurality of second touch detection lines 12 can also be disposed in different layers.

For example, the plurality of touch electrodes 13 have the same shape, so as to ensure that electrical characteristics of the plurality of touch electrodes 13 are substantially the same, thereby ensuring the accuracy of the touch detection. The present disclosure is not limited thereto, and the plurality of touch electrodes 13 can have different shapes. For example, as illustrated in FIG. 1, a shape of the touch electrode 13 can be a rectangle, such as a square. Cases are not limited to this example, and the shape of the touch electrode 13 can be a round, a trapezoid and the like according to the actual design requirement. The embodiments of the present disclosure do not specifically limit the shape of the touch electrode 13.

For example, the touch panel can be an in-cell touch panel. The touch panel can be a full in-cell (FIC) touch panel so that the structure can be simplified, the cost can be reduced, the touch signal-to-noise ratio can be improved and the touch sensitivity can be increased.

For example, the touch panel can be configured to display images, that is, the touch panel and a display panel can be formed in an integrated structure. For example, the touch panel can be a liquid crystal display panel, and the liquid crystal display panel comprises a common electrode. The touch electrodes 13 can be disposed in a same layer as the common electrode, that is, the touch electrodes 13 and the common electrode can be formed in one patterning process. Or, the common electrode can be multiplexed as the touch electrodes 13 through a time-division manner. For another example, the touch panel can be a light-emitting diode display panel, the light-emitting diode display panel comprises a light-emitting diode, and the light-emitting diode can be an organic light-emitting diode (OLED), a quantum-dot light-emitting diode (QLED) and the like. The touch electrodes 13 can be disposed in a same layer as an anode or a cathode of the light-emitting diode, that is, the touch electrodes 13 and the anode or the cathode of the light-emitting diode can be formed in one patterning process. Or, the anode or the cathode of the light-emitting diode can be multiplexed as the touch electrodes 13 through a time-division manner. That is to say, the touch electrodes performing the touch function can be integrated in the display panel, and the touch function and the display function can be integrated together without adding additional process. In this way, the manufacturing cost is reduced, the volume and weight of the display panel are decreased, and the additional value of the product is promoted. Meanwhile, in a case that the touch panel is a flexible display panel, the stability of the touch panel can be increased.

For example, the touch electrode 13 may be a transparent electrode, and the material of the transparent electrode can comprise, for example, indium tin oxide (ITO), indium zinc oxide (IZO), indium gallium oxide (IGO), gallium zinc oxide (GZO), zinc oxide (ZnO), indium oxide (In2O3), aluminum zinc oxide (AZO), carbon nano tube or the like.

For example, the substrate 10 can be a transparent insulating substrate, and the transparent insulating substrate can be for example a glass substrate, a quartz substrate or other suitable substrates.

For example, as illustrated in FIG. 1, the touch panel can further comprise a plurality of first gate lines 17. The plurality of first gate lines 17 extend along a row direction of the plurality of touch electrodes 13, and the row direction of the plurality of touch electrodes 13 is an X direction illustrated in the figure. For example, each touch electrode 13 is connected with a first gate line 17 through a first switch element 16. The touch electrodes 13 in the same row are connected with the same first gate line 17.

For example, the plurality of first gate lines 17 intersect with the plurality of second touch detection lines 12 and are insulated from the plurality of second touch detection lines 12. The plurality of first gate lines 17 also intersect with the plurality of first touch detection lines 11 and are insulated from the plurality of first touch detection lines 11. For example, the plurality of first gate lines 17 can be disposed in a different layer from the plurality of first touch detection lines 11 and the plurality of second touch detection lines 12. The present disclosure is not limited thereto, the first gate lines 17 can be disposed in a same layer with the first touch detection lines 11 and the second touch detection lines 12, provided that first gate lines 17 are insulated from the first touch detection lines 11 and the second touch detection lines 12.

For example, as illustrated in FIG. 1, the first switch element may comprise a first switch transistor. A first electrode of the first switch transistor is electrically connected with a second touch detection line 12, a second electrode of the first switch transistor is electrically connected with a touch electrode 13, and a gate electrode of the first switch transistor is electrically connected with a first gate line 17.

For example, the first switch transistor can be a thin-film transistor, a field-effect transistor or other switch devices with same characteristics. The thin-film transistor can comprise an oxide thin-film transistor, an amorphous silicon thin-film transistor or a poly-silicon thin-film transistor.

For example, the first gate line 17 is configured to provide a first gate signal to the gate electrode of the first switch transistor so as to control the first switch transistor to be turned on or turned off.

For example, the second touch detection line 12 can be disposed in the same layer as the gate electrode or the first electrode/the second electrode of the first switch transistor, so that the second touch detection line 12 and the gate electrode or the first electrode/the second electrode of the first switch transistor can be simultaneously formed in one patterning process. For another example, the first touch detection line 11 can also be disposed in the same layer as the gate electrode or the first electrode/the second electrode of the first switch transistor.

For example, as illustrated in FIG. 1, the first touch detection line 11 can be electrically connected with the touch electrode 13 through a first connection hole 14, and the second touch detection line 12 can be electrically connected with the touch electrode 13 through a second connection hole 15. For example, the first touch detection line 11 can be electrically connected with the touch electrode 13 through multiple first connection holes 14, and the second touch detection line 12 can be electrically connected with the touch electrode 13 through multiple second connection holes 15. The multiple first connection holes 14 can reduce the contact resistance between the touch electrode 13 and the first touch detection line 11. The multiple second connection holes 15 can reduce the contact resistance between the touch electrode 13 and the second touch detection line 12. As illustrated in FIG. 1, in one example, the number of the first connection hole 14 is two, and the number of the second connection hole 15 is also two.

For example, as illustrated in FIG. 2A, in one example, the touch panel further comprises a plurality of display pixels 20 arranged in plural rows and plural columns. For example, in a direction perpendicular to the substrate 10, each touch electrode 13 is overlapped with a sub-array comprising several display pixels 20. Each display pixel 20 can comprise a second switch element 201, and each row of the display pixels 20 in the sub-array is connected to a second gate line 23 through the respective second switch elements 201. Each second gate line 23 is configured to provide a second gate signal to the second switch element 201 so as to control the second switch transistor 201 to be turned on or turned off. That is, the display pixels overlapping one touch electrode 13 correspond to several second gate lines 23.

For example, any one of the second gate lines 23 corresponding to a touch electrode 13 can be multiplexed as the first gate line 17 which is connected with the touch electrode. That is, the first gate line 17 can be further configured to provide a second gate signal to a second switch element 201 to control the second switch element 201. For example, as illustrated in FIG. 2A, the second gate line 23 which is connected to the display pixel row closest to a boundary of the sub-array is selected to be multiplexed as the first gate line 17 which is connected with the first switch element 16. Obviously, the second gate line 23 which is connected with other row of display pixels 20 can also be selected to be connected with the first switch element 16, and the embodiments of the present disclosure is not limited thereto.

For example, the first gate line 17 is not multiplexed as any one second gate line 23, that is, the first gate line 17 is provided separately. For example, as illustrated in FIG. 2B, the first gate line 17 is not connected with any one second switch element 201.

For example, the touch panel is a liquid crystal display panel, and each display pixel 20 comprises a pixel electrode. In the direction perpendicular to the substrate 10, each touch electrode 13 is overlapped with several pixel electrodes. For another example, the touch panel is an organic light-emitting diode display panel, and each display pixel 20 comprises a light-emitting diode. In the direction perpendicular to the substrate 10, each touch electrode 13 is overlapped with several light-emitting diodes. For example, as illustrated in FIG. 2A and FIG. 2B, in one example, each touch electrode 13 can be overlapped with eight pixel electrodes or eight light-emitting diodes.

For example, as illustrated in FIG. 2A, the touch panel further comprises a plurality of data lines 22. The second switch element 201 can comprise a second switch transistor. A first electrode of the second switch transistor is electrically connected with a data line 22, a second electrode of the second switch transistor is electrically connected with a pixel electrode or a light-emitting diode, and a gate electrode of the second switch transistor is electrically connected with a second gate line 23.

For example, the first detection line 11 and the second detection line 12 can be disposed in the same layer as the gate electrode or the source/drain electrode of the second switch transistor.

For example, each of the first switch transistor and the second switch transistor can be a bottom-gate transistor or a top-gate transistor, which is not limited to the embodiments of the present disclosure.

For example, the second switch transistor can be of a same type as the first switch transistor. For example, the second switch transistor and the first switch transistor can be P-type transistors. However, the present disclosure is not limited thereto, and the second switch transistor can be of a different type from the first switch transistor. For example, the first switch transistor is a P-type transistor and the second switch transistor is an N-type transistor.

For example, the plurality of data lines 22 can extend along a column direction of the plurality of display pixels 20, and the column direction of the plurality of display pixels 20 can be the same as the column direction of the plurality of touch electrodes 13, so that the extension direction of the plurality of data lines 22 is the same as the extension directions of the first touch detection lines 11 and the second touch detection lines 12.

For example, the plurality of second gate lines 23 can extend along a row direction of the plurality of display pixels 20, and the row direction of the plurality of display pixels 20 can be the same as the row direction of the plurality of touch electrodes 13, so that the extending direction of the first gate lines 17 can be the same as the extending direction of the second gate lines 23.

For example, in a case the first gate lines 17 and the second gate lines 23 are provided separately, the first gate lines 17 and the second gate lines 23 can be disposed in a same layer. For example, the first gate lines 17 and the second gate lines 23 can be formed by the same materials and through a same patterning process. The first gate lines 17 and the second gate lines 23 can be disposed in different layers, which is not limited to the present disclosure.

For example, as illustrated in FIG. 1, the touch panel provided by the embodiments of the present disclosure further comprises a data driver (not shown) and a gate driver 55. The data driver is configured to provide data signals to the display pixels 20. In the example illustrated in FIG. 2A, some of the second gate lines 23 are multiplexed as the first gate lines 17, and the gate driver 55 is further configured to provide the first gate signals and the second gate signals to the second gate lines 23 multiplexed as the first gate lines 17 in a time-division manner. In the example as illustrated in FIG. 2B, the first gate lines 17 and the second gate lines 23 are provided separately, the gate driver 55 is configured to provide the first gate signals to the first gale lines 17 and provide the second gate signals to the second gale lines 23 separately, that is, the first gate lines 17 and the second gate lines 23 can share one gate driver 55.

For example, the first gate signals and the second gate signals can be different signals. In the example as illustrated in FIG. 2A, in a case that the first switch transistor is a P-type transistor, and the second switch transistor is a N-type transistor, the First gate signals can be low-level signals and the second gate signals can be high-level signals. When the first switch transistor is turned on, the second switch transistor is turned off; when the first switch transistor is turned on, the second switch transistor is turned off. In this way, the interference between the display operation and the touch operation of the touch panel can be avoided. However, the present disclosure is not limited thereto, and the first gate signals and the second gate signals can also be the same signals. In the example as illustrated in FIG. 2B, in a case the first switch transistor and the second switch transistor are both P-type transistors, and the first gate signals and the second gate signals can both be low-level signals.

For example, the data driver and the gate driver 55 can be implemented through respective application specific integrated circuit chips respectively.

For example, as illustrated in FIG. 1, the touch panel further comprises a touch driving circuit 31, a touch detection circuit 32 and a touch control circuit 33. The touch driving circuit 31 is configured to provide touch driving signals to the plurality of first touch detection lines 11 and the plurality of second touch detection lines 12. The touch detection circuit 32 is configured to detect touch sensing signals output by the plurality of first touch detection lines 11 so as to determine whether the abnormal touch electrode is present. The touch control circuit 33 is configured to control the second touch detection lines 12 to output the touch driving signals to the abnormal touch electrode.

For example, the touch driving signal can be a pulse voltage signal.

For example, the touch electrodes located in the same column can also be respectively connected with multiple (e.g. two or three) second touch detection lines 12 through the first switch elements 16, so as to simultaneously transmit touch driving signals to the multiple abnormal touch electrodes of the touch electrodes 13 in the same column.

For example, the touch driving circuit 31, the touch detection circuit 32 and the touch control circuit 33 can all be implemented through hardware circuits. For another example, the touch driving circuit 31, the touch detection circuit 32 and the touch control circuit 33 can also be implemented through signal processors such as FPGA, DSP, CMU or the like. The touch control circuit 33 can comprise a processor and a memory for example. The processor can execute a software program stored in the memory so as to achieve functions of controlling the first touch detection lines 11 and the second touch detection lines 12 respectively.

For example, the touch driving circuit 31, the touch detection circuit 32 and the touch control circuit 33 can be implemented through the same integrated circuit chip. For example, the touch driving circuit 31, the touch detection circuit 32 and the touch control circuit 33 can be integrated into one touch chip.

For example, in a case that the first touch detection lines 11, the second touch detection lines 12 and the data lines 22 extend in the same direction, the data driver and the touch chip can be disposed together.

For example, the touch panel further comprises a controller (not shown in the drawing). The controller is coupled with the data driver, the gate driver 55 and the touch chip, and is configured to provide control instructions and/or sequence signals to the data driver, the gate driver 55 and the touch chip, so that the data driver, the gate driver 55 and the touch chip can cooperatively work.

For example, as illustrated in FIG. 2A, some of the second gate lines 23 are multiplexed as the first gate lines 17. The driving process of the touch panel comprises a touch period and a display period, in the following, the first switch transistors are P-type transistors and the second switch transistors are N-type transistors, which are taken as an example to describe the present disclosure.

During the touch period, in a case that the abnormal touch electrode exists in the touch panel, the controller can control the gate driver 55 to generate and output the first gate signal, and the first gate signal can be a low-level signal. The first gate line 17 can transmit the first gate signal to the gate electrode of the first switch transistor connected with the abnormal electrode. Meanwhile, the gate electrode of the second switch transistor controlled by the second gate line 23 which is multiplexed as the first gate line 17 can also receive the first gate signal. In this way, the first switch transistor connected with the abnormal touch electrode is turned on and the second switch transistor controlled by the second gate line 23 multiplexed as the first gate line 17 is turned off. The controller can further control the touch chip to generate and output the touch driving signal. The second touch detection line 12 can transmit the touch driving signal to the abnormal electrode, so that the touch function of the touch panel is achieved. During the display period, the controller can control the gate driver 55 to generate and output the second gate signal, and the second gate signal can be a high-level signal. The first gate line 17 transmit the second gate signal to the gate electrode of the first switch transistor and the gate electrode of the second switch transistor, thus the first switch transistor is turned off and the second switch transistor is turned on. The controller can further control the data driver to generate and output display data signals, the data lines 22 can transmit the display data signals to the pixel electrodes or the light-emitting diodes of the display pixels 20 so as to achieve the display function of the touch panel.

For example, in the example illustrated in FIG. 2A, the first switch transistor and the second switch transistor can also be the same type transistor, such as P-type transistors. In this way, the first switch transistor and the second switch transistor are turned on or off simultaneously. Thus, during the touch period, the controller can be further configured to control the data driver not to output the display data signals, that is, the data lines are floating; during the display period, the controller is configured to control the touch chip not to output the touch driving signals, that is, the first touch detection lines and the second touch detection lines are all floating.

For example, as illustrated in FIG. 2B, the first gate line 17 and the second gate line 23 are provided respectively. In the following, the first switch transistor and the second switch transistor both are P-type transistors, which are taken as an example to describe the present disclosure. During the touch period, in a case that the abnormal touch electrode exists in the touch panel, the controller controls the gate driver 55 to generate and output the first gate signal, and the first gate signal can be a low-level signal. The first gate line 17 can transmit the first gate signal to the gate electrode of the first switch transistor connected with the abnormal electrode so as to turn on the first switch transistor connected with the abnormal touch electrode. The controller can further control the touch chip to generate and output the touch driving signal and the second touch detection line 12 can transmit the touch driving signal to the abnormal touch electrode, so that the touch function of the touch panel can be achieved. During the display period, the controller is configured to control the gate driver 55 to generate and output the second gate signal and the second gate signal can also be a low-level signal. The second gate line 23 transmits the second gate signal to the gate electrode of the second switch transistor so as to turn on the second switch transistor. The controller can be further configured to control the data driver to generate and output the display data signals, and the data lines 22 can transmit the display data signals to the pixel electrodes or the light-emitting diodes of the display pixels 20, so as to achieve the display function of the touch panel. The touch period and the display period can take place simultaneously. In order to avoid mutual interference between the display data signals and the touch driving signals, the touch period and the display period can also take place in a time-division manner.

It should be noted that in the example illustrated in FIG. 2B, the first switch transistor and the second switch transistor can also be different types of transistors.

Figure 3:
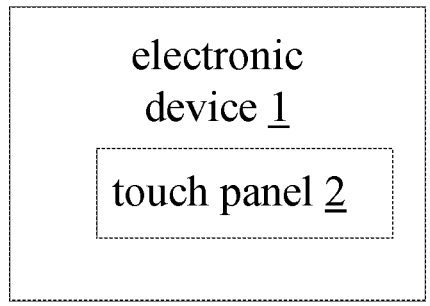
FIG. 3 is a schematic block diagram of an electronic device provided by an embodiment of the present disclosure.

FIG. 3 is a schematic block diagram of an electronic device provided by an embodiment of the present disclosure.

For example, as illustrated in FIG. 3, the electronic device 1 can comprise the touch panel 2 provided by any one embodiment of the present disclosure.

For example, the touch panel 2 can be a rectangular touch panel, a circular touch panel, an elliptical touch panel, a polygonal touch panel or the like. Besides, the touch panel 2 can be not only a flat touch panel but also a curved touch panel, even a spherical touch panel. In a case that the touch panel 2 is a curved display panel, the touch electrode configured for achieving the touch function and the anode/cathode of the light-emitting diode or the common electrode can be integrated together, so that the touch panel 2 can improve the stability of the flexible display.

For example, the electronic device 1 provided by the embodiments of the present disclosure can be any products or components that has touch and display functions such as a cellphone, a tablet computer, a television, a monitor, a laptop, a digital frame, a navigator and the like.

It should be noted that other components (e.g., the control device, the image data coder/decoder, the line scanning driver, the row scanning driver, the clock circuit and the like) of the electronic device 1 are interpreted to be included in the electronic device for those skilled in the art, which is not repeated herein and should not be limited to the present disclosure.

Figure 4:
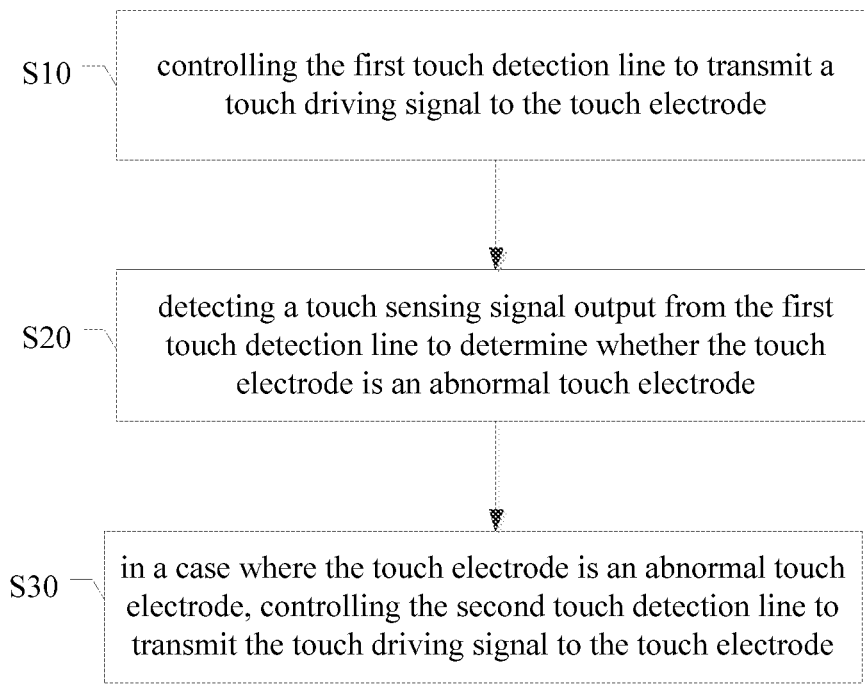
FIG. 4 is a schematic flow chart of a touch method of a touch panel provided by an embodiment of the present disclosure.

FIG. 4 is a schematic flow chart of a touch method of a touch panel provided by an embodiment of the present disclosure.

For example, as illustrated in FIG. 4, one example of the touch method provide by the embodiments of the present disclosure comprises following steps:

Step S10: controlling the first touch detection line to transmit a touch driving signal to the touch electrode;

Step S20: detecting a touch sensing signal output from the first touch detection line, so as to determine whether the touch electrode is an abnormal touch electrode; and Step S30: in a case where the touch electrode is an abnormal touch electrode, controlling the second touch detection line to transmit the touch driving signal to the touch electrode.

For example, during the step S10, the touch chip can generate and output the touch driving signals, and then the plurality of first touch detection lines can respectively transmit the touch driving signals to the plurality of touch electrodes simultaneously.

For example, the touch driving signal can be a pulse voltage signal.

For example, during the step S20, the touch chip can read a plurality of touch sensing signals of the plurality of touch electrodes through the plurality of first touch detection lines, and in a case that the touch chip fails to read the touch sensing signal through a certain first touch detection line, it means that the touch electrode electrically connected with the certain first touch detection line is the abnormal touch electrode. That is to say, an abnormality occurs on the first touch detection line electrically connected with the abnormal touch electrode, that is, a scratch or a short occurs to the first touch detection line, an exception occurs to the first connection hole corresponding to the first touch detection line, or the like.

For example, the touch panel comprises a plurality of first gate lines. The first switch element comprises the first switch transistor. The first electrode of the first switch transistor is connected with one second touch detection line, the second electrode of the first switch transistor is connected with one touch electrode, and the gate electrode of the first switch transistor is connected with one first gate line. In this case, the step S30 can comprise:

Step S301: transmitting the first gate signal to the first switch transistor connected with the abnormal touch electrode through the first gate line, so as to turn on the first switch transistor connected with the abnormal touch electrode;

Step S302: transmitting the touch driving signal to the abnormal touch electrode through the second touch detection line.

For example, during the step S301, the gate driver can generate and output the first gate signal, and the first gate line transmits the first gate signal to the gate electrode of the first switch transistor connected with the abnormal touch electrode so as to turn on the first switch transistor connected with the abnormal touch electrode.

For example, during the step S302, the touch chip can generate and output the touch driving signal, and the second touch detection line can transmit the touch driving signal to the abnormal touch electrode through the first switch transistor connected with the abnormal touch electrode. The touch chip can further read the touch sensing signal of the abnormal touch electrode through the second touch detection line, so as to achieve the touch function of the touch panel.

It should be noted that the detailed structure of the touch panel can be referred to the related descriptions about the touch panel provided by the above mentioned embodiments, which is not repeated here.

A driving method of the touch panel is further provided by an embodiment of the present disclosure.

For example, the driving method of the touch panel provided by the embodiments of the present disclosure can comprise a display period and a touch period. The driving method comprises the following steps:

Step S50: during the display period, transmitting the display data signals to the display pixels through the data lines so as to achieve the display function;

Step S55: during the touch period, transmitting the touch driving signals to the touch electrodes through the first touch detection lines or through the first touch detection lines and the second touch detection lines so as to achieve the touch function.

For example, in the example illustrated in FIG. 2A, the touch panel comprises a plurality of second gate lines 23, some of which are multiplexed as the first gate lines 17. The step S50 can comprise: controlling the gate driver to generate and output the second gate signals through the controller; transmitting the second gate signals to the gate electrodes of the second switch transistors through the second gate lines so as to turn on the second switch transistors; controlling the data driver to generate and output the display data signals through the controller; and transmitting the display data signals to the display pixels through the data lines so as to achieve the display function.

For example, in the example illustrated in FIG. 2B, the touch panel comprises a plurality of second gate lines 23, and the second gate lines 23 and the first gate line 17 are respectively provided. The step S50 can comprise: controlling the gate driver to generate and output the second gate signals through the controller; transmitting the second gate signals to the gate electrodes of the second switch transistors through the second gate lines so as to turn on the second switch transistors; controlling the data driver to generate and output the display data signals through the controller; and transmitting the display data signals to the display pixels through the data lines so as to achieve the display function.

For example, in the examples as illustrated in FIG. 2A and FIG. 2B, the step S55 can comprise: controlling the touch chip to generate and output the touch driving signals through the controller; transmitting the touch driving signals to the touch electrodes through the first touch detection lines; detecting the touch sensing signals output from the first touch detection lines so as to determine whether the abnormal touch electrode exists; in a case that no abnormal touch electrode exists, determining the touch operation according to the touch sensing signals output from the first touch detection lines; in a case that the abnormal touch electrode exists, controlling the gate driver to generate and output the first gate signal through the controller, and transmitting the first gate signal to the gate electrode of the first switch transistor connected with the abnormal touch electrode through the first gate line so as to turn on the first switch transistor connected with the abnormal touch electrode; then transmitting the touch driving signal to the abnormal touch electrode through the second touch detection line, and reading the touch sensing signal of the abnormal touch electrode through the second touch detection line so as to achieve the touch function.

For example, during the touch period, the data lines are floating. During the display period, the first touch detection lines and the second touch detection lines are floating.

It should be noted that detailed descriptions about the touch period can be referred to the related descriptions about the touch method provided by the above mentioned embodiments, which is not repeated here.

For example, the sequence diagram for driving the touch panel can be designed according to actual need and is not limited in the embodiments of the present disclosure.

For example, the duration of the touch period can be shorter than the duration of the display period, but the present disclosure is not limited thereto. For example, according to actual need, the duration of the touch period can be the same as the duration of the display period; or the duration of the touch period can be half or one tenth of the duration of the display period, which is not limited in the embodiments of the present disclosure.

The above mentioned steps are not set in particular orders. Each display period is not necessarily accompanied with a touch period. In a case that the touch accuracy is satisfied, every two or more display periods may correspond to one touch period so as to reduce the power consumption.

According to actual need, the driving method can further comprise a compensation period, a reset period and the like. The compensation period and the reset period can be set prior to the display period. For example, two or more display periods can correspond to one compensation period and one reset period.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What are described above are only specific implementations of the present disclosure, the protection scope of the present disclosure is not limited thereto, and the protection scope of the present disclosure should be based on the protection scope of the claims.

The application claims priority to Chinese patent application No. 201710874888.5, filed on Sep. 25, 2017, the entire disclosure of which is incorporated herein by reference as part of the present application.

What is claimed is:

1. A touch panel, comprising: a first touch detection line, a touch electrode, a second touch detection line, a first switch element, a first gate line, and a display pixel,
wherein the first gate line is connected with the touch electrode through the first switch element;
the first switch element comprises a first switch transistor; a first electrode of the first switch transistor is connected with the second touch detection line, a second electrode of the first switch transistor is connected with the touch electrode, and a gate electrode of the first switch transistor is connected with the first gate line;
the first gate line is configured to provide a first gate signal to the gate electrode of the first switch transistor to control the first switch transistor;
the first touch detection line is directly electrically connected with the touch electrode and is insulated from the second detection line, and the second detection line is connected with the touch electrode through the first switch element;

the display pixel comprises a second switch element, and the first gate line is further connected with the second switch element to control the second switch element;

the second switch element comprises a second switch transistor;

a first electrode of the second switch transistor is connected with the second touch detection line, a second electrode of the second switch transistor is connected with a pixel electrode of the display pixel, and a gate electrode of the second switch transistor is connected with the first gate line.

2. The touch panel according to claim 1, further comprising a display pixel, wherein the display pixel comprises a second switch element, and the first gate line is further configured to provide a second gate signal to the second switch element to control the second switch element;

the first gate signal is different from the second gate signal.

3. The touch panel according to claim 1, comprising: a plurality of touch electrodes, a plurality of first touch detection lines, a plurality of second touch detection lines, and a plurality of first switch elements, wherein the plurality of touch electrodes are arranged in plural rows and plural columns;

the plurality of first touch detection lines are respectively connected with the plurality of touch electrodes in one-to-one correspondence;

the plurality of second touch detection lines extend along a column direction of the plurality of touch electrodes, and are respectively connected with the columns of the plurality of touch electrodes in one-to-one correspondence through the plurality of first switch elements.

4. The touch panel according to claim 3, further comprising a plurality of first gate lines, wherein the plurality of first gate lines extend along a row direction of the plurality of touch electrodes, and are respectively connected with the rows of the plurality of touch electrodes in one-to-one correspondence through the plurality of first switch elements.

5. The touch panel according to claim 1, further comprising a touch driving circuit, wherein the touch driving circuit is configured to provide a touch driving signal to the first touch detection line and the second touch detection line.

6. The touch panel according to claim 5, further comprising a touch detection circuit, wherein the touch detection circuit is configured to detect a touch sensing signal output from the first touch detection line to determine whether an abnormal touch electrode is present.

7. The touch panel according to claim 6, further comprising a touch control circuit, wherein the touch control circuit is configured to control the second touch detection line to transmit the touch driving signal to the abnormal touch electrode.

8. The touch panel according to claim 1, wherein an extension direction of the first touch detection line is same as an extension direction of the second touch detection line.

9. An electronic device, comprising the touch panel according to claim 1.

10. A touch method of the touch panel according to claim 1, comprising:

controlling the first touch detection line to transmit a touch driving signal to the touch electrode;

detecting a touch sensing signal output from the first touch detection line to determine whether the touch electrode is an abnormal touch electrode; and in a case where the touch electrode is an abnormal touch electrode, controlling the second touch detection line to transmit the touch driving signal to the touch electrode.

11. The touch method according to claim 10, wherein the touch panel further comprises a first gate line, and the first switch element comprises a switch transistor; a first electrode of the switch transistor is connected with the second touch detection line, a second electrode of the switch transistor is connected with the touch electrode, and a gate electrode of the switch transistor is connected with the first gate line, wherein controlling of the second touch detection line to transmit the touch driving signal to the abnormal touch electrode comprises:

transmitting a first gate signal to the switch transistor connected with the abnormal touch electrode through the first gate line, so as to turn on the switch transistor connected with the abnormal touch electrode; and transmitting the touch driving signal to the abnormal touch electrode through the second touch detection line.

12. The touch panel according to claim 1, comprising a plurality of touch electrodes, a plurality of first touch detection lines, a plurality of second touch detection lines, and a plurality of first switch elements, wherein the plurality of touch electrodes are arranged in plural rows and plural columns;

the plurality of first touch detection lines are respectively connected with the plurality of touch electrodes in one-to-one correspondence;

the plurality of second touch detection lines extend along a column direction of the plurality of touch electrodes, each of the plurality of second touch detection lines corresponds to one column of the touch electrodes, and the touch electrodes in each column are connected with the corresponding one second detection line respectively through one of the plurality of first switch elements.

* * * * *